United States Patent [19]

Fontaine

[11] 4,424,844
[45] Jan. 10, 1984

[54] TIRE TREAD

[75] Inventor: Jean F. L. Fontaine, Bürden, Luxembourg

[73] Assignee: The Goodyear Tire & Rubber Company, Akron, Ohio

[21] Appl. No.: 358,944

[22] Filed: Mar. 17, 1982

[51] Int. Cl.$^3$ ............................................. B60C 11/00
[52] U.S. Cl. ............................... 152/209 R; D12/139
[58] Field of Search .......... 152/209 R, 209 A, 209 D; D12/136, 139, 144, 143, 142

[56] References Cited

U.S. PATENT DOCUMENTS

| | | | |
|---|---|---|---|
| D. 100,118 | 6/1936 | Nellen et al. | D12/146 |
| D. 112,978 | 1/1939 | James | D12/144 |
| D. 113,651 | 3/1939 | Balthazar | D12/141 |
| D. 215,521 | 9/1969 | Porten | D12/139 |
| D. 236,710 | 9/1975 | Buck et al. | D12/144 |
| 3,000,421 | 9/1961 | Hack et al. | 152/209 R |
| 3,674,077 | 7/1972 | Verdier | 152/209 R |
| 3,705,613 | 12/1972 | Verdier | 152/209 R |
| 4,057,089 | 11/1977 | Johannsen | 152/209 R |

FOREIGN PATENT DOCUMENTS 2000054 10/1971 France .
1000844 9/1981 United Kingdom .

*Primary Examiner*—Michael W. Ball
*Attorney, Agent, or Firm*—Frank Pincelli

[57] ABSTRACT

A tire having a tread pattern having a plurality of generally elliptically shaped grooves disposed such that one axis is substantially perpendicular to the mid-circumferential centerplane and the other axis is disposed closely adjacent the tread edge.

9 Claims, 7 Drawing Figures

TIRE TREAD

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to tires and more particularly to an improved tread pattern for tires. It is well known in the tire industry that the choice of a particular tread design involves trade-off between specific tire performance characteristics. For example, a tread pattern which has good wet traction or snow traction is generally obtained at the expense of dry road traction, tread wear, rolling resistance, ride and noise level, and a tread pattern which has good tread wear and low rolling resistance is generally obtained at the expense of wet and snow traction. In the prior art when improved wet traction or improved hydroplaning performance was desired, the void volume in the tread area of the tire was simply increased by either enlarging the width of the grooves or by increasing the depth of the non-skid of the tread or by doing both. However, increasing the void volume in this manner generally results in a reduction in performance in dry traction, handling, tread wear and/or an increase in noise level.

Applicant has discovered a particular groove shape arrangement whereby acceptable levels of wet traction and hydroplaning characteristics of a tire are maintained while also maintaining or improving other performance characteristics such as rolling resistance, tread wear, noise levels, traction and handling.

DETAILED DESCRIPTION OF THE INVENTION

Figure 1:
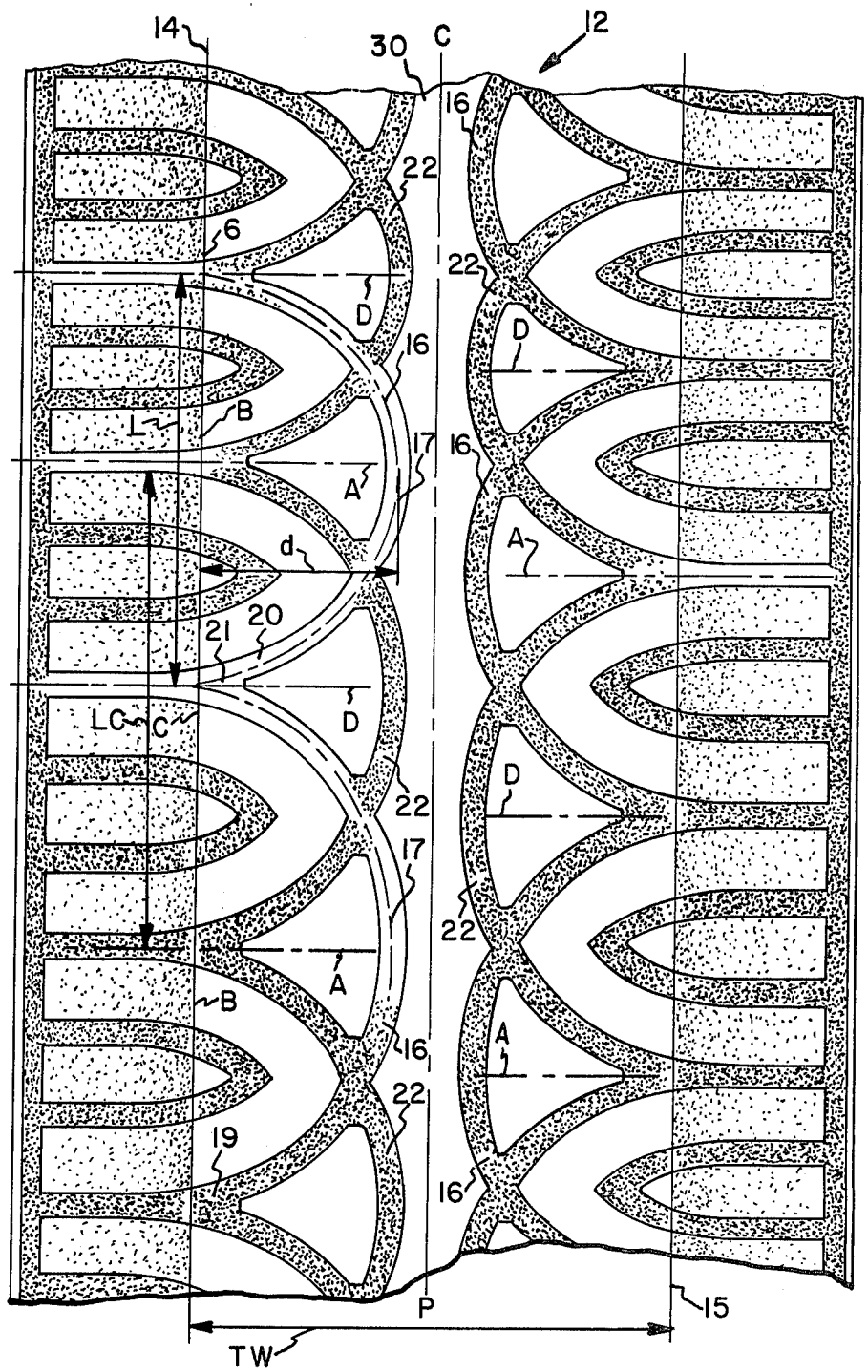
FIG. 1 is a fragmentary plan view of a portion of a tread of a tire made in accordance with the present invention.

Referring to FIG. 1, there is illustrated a fragmentary plan view of a tread 12 for a pneumatic tire made in accordance with the present invention. The tread pattern illustrated in FIG. 1 is particularly adapted for passenger pneumatic tires and more particularly to pneumatic tires having a carcass structure of the radial type construction and having a belt reinforcing ply structure disposed radially outwardly of the carcass ply structure in the tread region of the tire. For the purposes of this invention, a radial type tire is a tire wherein the cords of the carcass reinforcing ply structure are disposed at an angle from about 75° to 90° with respect to the mid-circumferential centerplane CP of the tire.

The tread is provided with a set of grooves 16 disposed about the entire circumference of the tire which extend from each of the axially opposed tread edges 14,15 respectively and extend axially across a portion of the tread 12. The grooves 16 each have a cross-sectional width such that when in the footprint of the tire the grooves 16 do not close up at the tread surface. Preferably, the grooves 16 each have a substantially constant width. The center line of each groove 16 generally follows a portion of a path formed by an ellipse having an axis A and an axis B. The axis A is disposed substantially perpendicular to the mid-circumferential centerplane CP of the tire 10 and the axis B of the ellipse is disposed substantially parallel to the mid-circumferential centerplane and closely adjacent to the tread edge 14 or 15 from which any particular groove 16 extends. The axis B of each groove 16 is disposed from the tread edge 14 or 15 from which it extends a distance no greater than about one-eighth (⅛) the tread width TW. Preferably, the axis B is disposed axially inward of the tread edge toward the mid-circumferential centerplane CP. In the particular embodiment illustrated, the axis B lies substantially along its respective tread edge. The length L of the axis B ranges from approximately fifty percent (50%) to one hundred twenty percent (120%) of the tread width TW and preferably from about seventy percent (70%) to one hundred percent (100%), the length L of the particular embodiment illustrated is approximately eighty percent (80%) of the tread width TW. For the purposes of this invention, the tread width TW of the tire is the maximum axial width of the tread 12 measured perpendicular to the mid-circumferential centerplane CP of the tire as determined from the footprint of the tire when the tire is inflated to design inflation pressure and at rated load. The grooves 16 extend axially across the tread 12 a distance of at least twenty-five percent (25%) of the tread width TW and preferably a distance of at least thirty-five percent (35%) and no greater than seventy-five percent (75%) of the tread width TW, preferably no greater than forty-five percent (45%) of the tread width TW so as to provide a continuous circumferentially extending rib in the central portion of the tire. In the particular embodiment illustrated, the axially innermost point of the center line of each of the grooves 16 is disposed from the tread edge from which it starts a distance d of approximately forty-five percent (45%) of the tread width TW, forming circumferentially continuous extending rib 30. Rib 30 contributes to reducing the noise level of the tire.

The axis A of circumferentially adjacent elliptical grooves 16 which extend from the same tread edge are spaced circumferentially apart a distance approximately equal to the length of the axis B. Each elliptically shaped groove 16 has a pair of ends 19,21 which open up into tread edge 14,15 respectively. Each groove 16 extends from end 19 across the tread 12 to end 21 of the same groove in a substantially continuous manner. Each groove 16 comprises a pair of branches 20 which extends from openings 19,21 to a common point 17 where they coincide. The center line of each branch 20 of each groove 16 is substantially tangent to the center line of the branch 20 of the next circumferentially adjacent groove 16, thereby making the adjacent branches 20 substantially mutually tangent to each other. Accordingly, circumferentially adjacent branch 20 merges into a single groove having substantially the same longitudinal direction at or near the point at which they merge. The mutual tangency of the adjacent branch contributes to minimize the turbulance of any fluid that may be present in this area.

The provision of substantially elliptically shaped grooves provides for efficient water removal from the footprint of the tire by minimizing any turbulance the fluid may experience as it proceeds from the center portion of the tread to the tread edge. The systematic placement of the circumferentially adjacent grooves 16 about the tire maximize the use of the available void area required to remove fluid from the footprint of the tire. Accordingly, a tread pattern designed in accordance with the present invention provides for efficient removal of any fluid that may be present in the footprint of the tire while also providing other performance characteristics such as dry traction, noise levels and low rolling resistance.

A second set of elliptically shaped grooves 22 is provided, each groove 22 following a substantially identical elliptical path which grooves 16 follow. The axis C of each groove 22 has a length LC and is parallel to the mid-circumferential centerplane of the tire and preferably lie substantially in the same plane as the axis B of the elliptically shaped grooves 16. The axis D of each groove 22 is substantially perpendicular to the mid-circumferential centerplane of the tire 10 and is preferably parallel to the axis A of groove 16. The first and second set of elliptically shaped grooves 16,22 respectively, combine to form a family of elliptically shaped grooves. The elliptically shaped grooves 16,22 are substantially identical to each other but are displaced at different positions circumferentially about the tire; preferably the elliptically shaped grooves 16 and 22 are disposed about the tire such that the axis D of each groove 22 is disposed approximately midway between the axes A of circumferentially adjacent grooves 16. The present invention is not limited to such displacement. The axis D may be positioned at any desired position between the axis A of circumferentially adjacent grooves 16. However, as previously stated, axis D is preferably disposed about midway between the adjacent axis A. Additional sets of elliptically shaped grooves may be added to the family if desired; in such event it is preferred that the axes of circumferentially adjacent grooves which are perpendicular to the mid-circumferential centerplane of the tire be spaced circumferentially apart substantially equidistant so as to minimize a concentration of void areas along the circumference of the tire. While the particular embodiment of FIG. 1 illustrates two sets of elliptically shaped grooves, only one set of grooves is required to practice the invention.

The tread 12 is provided with sufficient grooves such that the amount of void area present in the tread will be able to handle any water or fluid present in the footprint of the tire. Accordingly, the tread portion 12 is provided with a sufficient number of grooves having a predetermined shape and configuration so that the net to gross ratio of the tread in the footprint of the tire is at least fifty percent (50%) and preferably no greater than seventy percent (70%). For the purposes of this invention, the net to gross of the tread is the ratio of the total area of the tread which comes into contact with the road surface to the total footprint area of the tread. The grooves in the tread 12 are disposed such that from about six (6) to fourteen (14) branches of the elliptically shaped grooves are present in the footprint of the tire from each of the tread edges.

It is preferred that the axis A of each of the grooves 16 which extends from tread edge 14 are spaced circumferentially apart from the axis A of groove 16 which starts from the other tread edge 15 so as not to lie in the same radial plane to minimize noise production of the tread edge, preferably the axes A of grooves 16 which start from tread edge 14 is positioned midway between the axis A of grooves 16 which start from tread edge 15.

Figure 2:
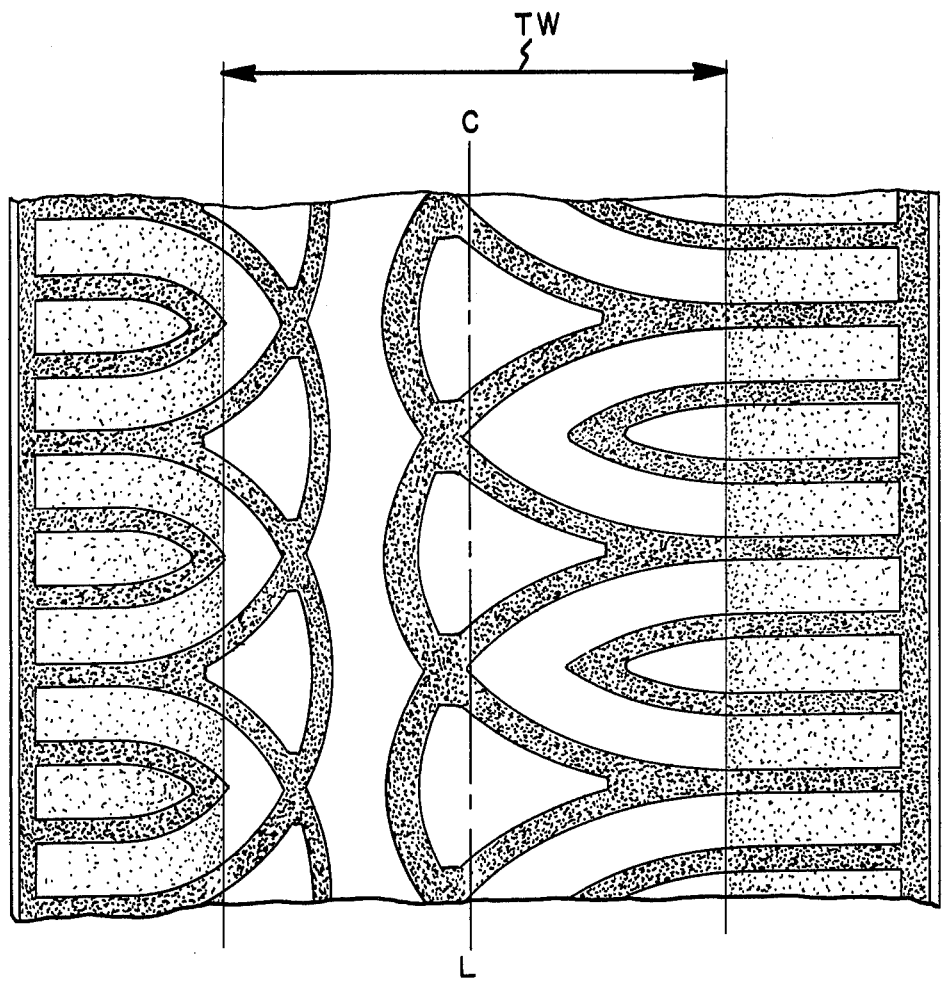
FIG. 2-7 illustrate various modified forms of the tread for a tire made in accordance with the present invention.
Figure 3:
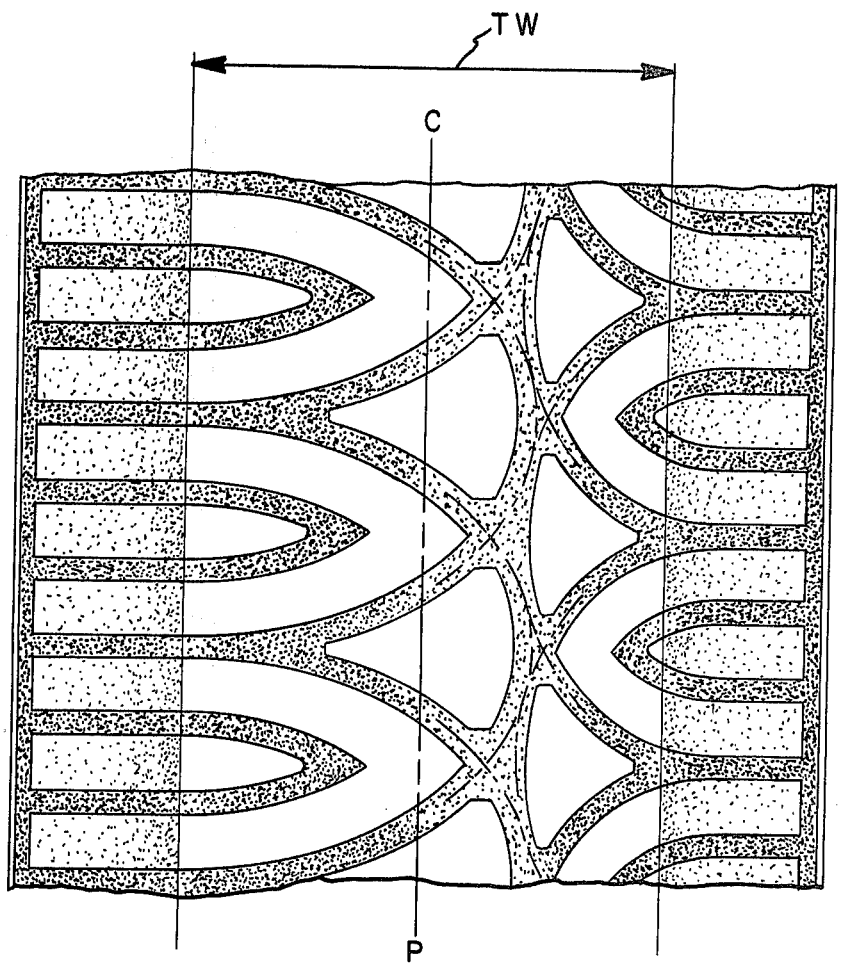

In the embodiment illustrated in FIG. 1, the grooves 16,22 which extend from tread edge 14 are substantially identical to the grooves 16,22 which extend from the opposed tread edge 15. However, if desired, the grooves extending from one tread edge 14 may be different in size, shape or configuration from that extending from the other tread edge such as is illustrated in FIGS. 2, 3 to form an asymmetric tread pattern.

Figure 4:
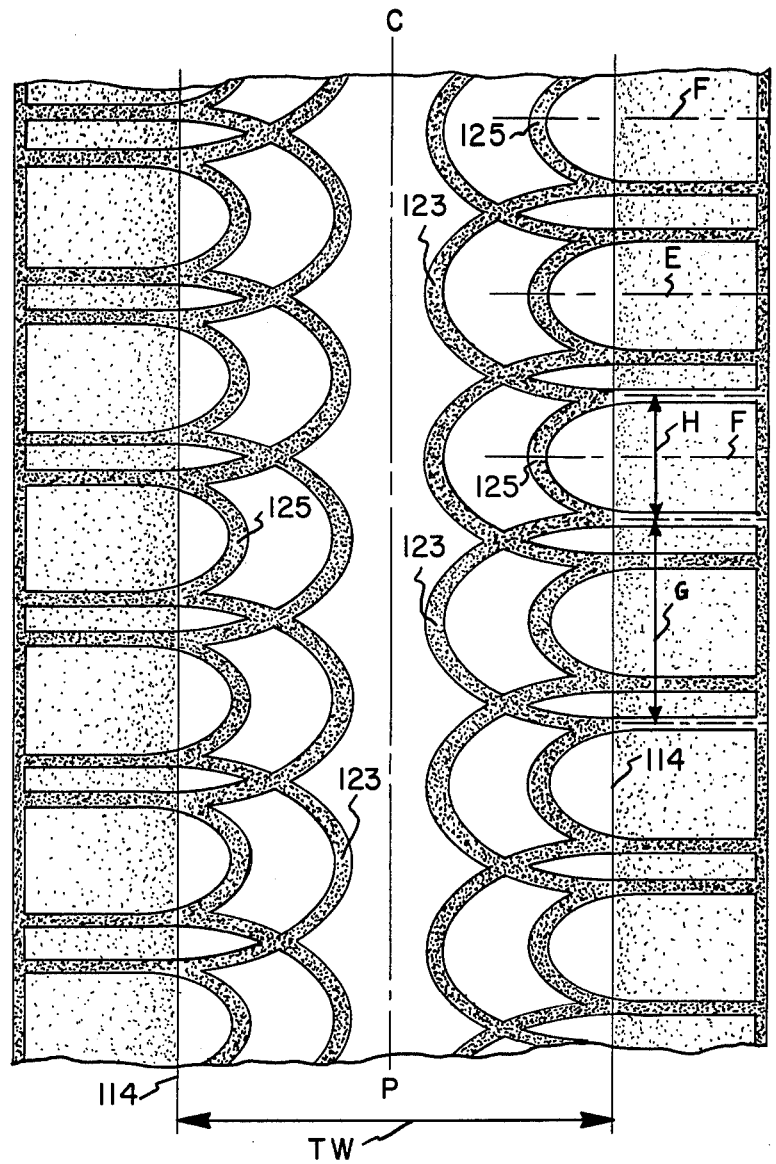
Figure 5:
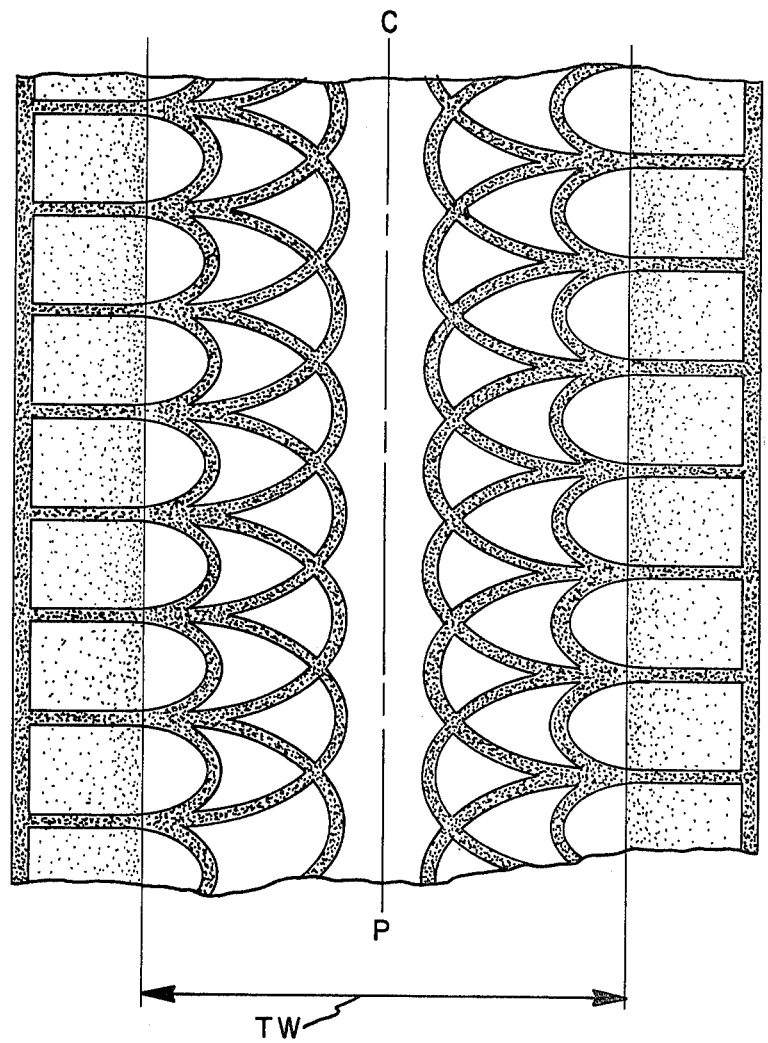

In the particular embodiment illustrated in FIG. 1, the grooves 16 which extend from the same tread edge each follow substantially identical elliptical paths. However, if desired, the circumferentially adjacent grooves 16 may vary in size about the circumference of the tire. Referring to FIG. 4, there is illustrated two sets of elliptically shaped grooves extending from each tread edge wherein each set is provided with two different alternating size grooves 123,125. The branches of circumferentially adjacent grooves 123,125 of each set are substantially mutually tangent to each other in the area of the tread closely adjacent the tread edge. The grooves 123,125 each have an axis E and F, respectively, which lie substantially perpendicular to the mid-circumferential centerplane CP of the tire and an axis G and H, respectively, which lie substantially parallel to the mid-circumferential centerplane and disposed closely adjacent the tread edge so that the axis G and H are each spaced an axial distance no greater than about one-eigth ($\frac{1}{8}$) of the tead width TW from the closest tread edge. When two sets of grooves are provided as illustrated in FIG. 4, it is preferred that the length of the smaller axis H of groove 125 be equal to about two-thirds ($\frac{2}{3}$) of the larger axis G. This assures uniform void distribution in the shoulder region of the tread. When only one set of different alternating sized elliptically shaped grooves are used, any desired size relationship between the different size groove may be selected.

FIG. 4 illustrates an embodiment wherein three sets of alternating sized elliptically shaped grooves are provided. The length of the axis of the smaller elliptically shaped grooves which is parallel to the mid-circumferential centerplane CP of the tire is equal to substantially one-half ($\frac{1}{2}$) of the axis of the larger elliptically shaped groove which is parallel to the mid-circumferential centerplane CP of the tire. This relationship assures uniform void distribution in the shoulder region of the tread.

Figure 6:
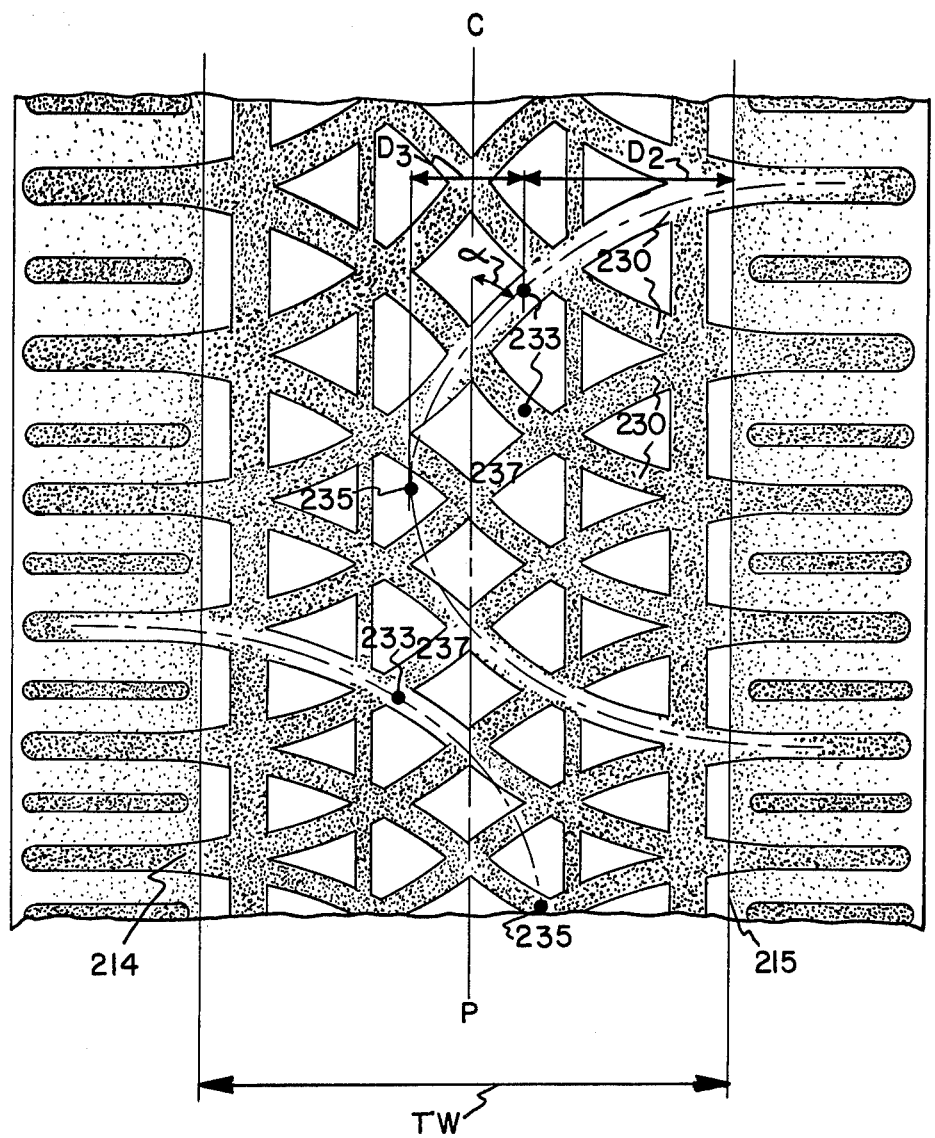

Referring to FIG. 6, the elliptically shaped grooves which extend from tread edge 214 if allowed to continue would intersect the grooves which start from the opposed tread edge 215. The dotted lines indicate the path which the center line of the elliptically shaped grooves would follow if allowed to extend past the intersection of the elliptically shaped grooves which start from the opposed tread edge. The branches 230 of the grooves follow an elliptical path from the tread edge to a termination point 233, which is spaced from the tread edge from which it starts a distance D2 no less than about thirty percent (30%) of the tread width TW, preferably a distance of at least forty percent (40%) of the tread width TW. The termination point 233 of each branch 230 is spaced from the summit 235 of the elliptical path which center line grooves follow an axial distance D3 which is no greater than about one-fourth ($\frac{1}{4}$) of the tread width TW. For the purposes of this invention, the summit 235 of the elliptical path is the point at which the elliptical path is spaced furthest from the tread edge from which it starts. From the termination point 233 at which the center line of branch 230 of grooves depart from the elliptical path, a groove 237 extends across the tread to connect with a corresponding branch of elliptically shaped groove starting from the opposed tread edge. Each of the generally straight grooves 237 is oriented such that it forms an angle α with the mid-circumferential centerplane of the tire and is no greater than about 60°.

Figure 7:
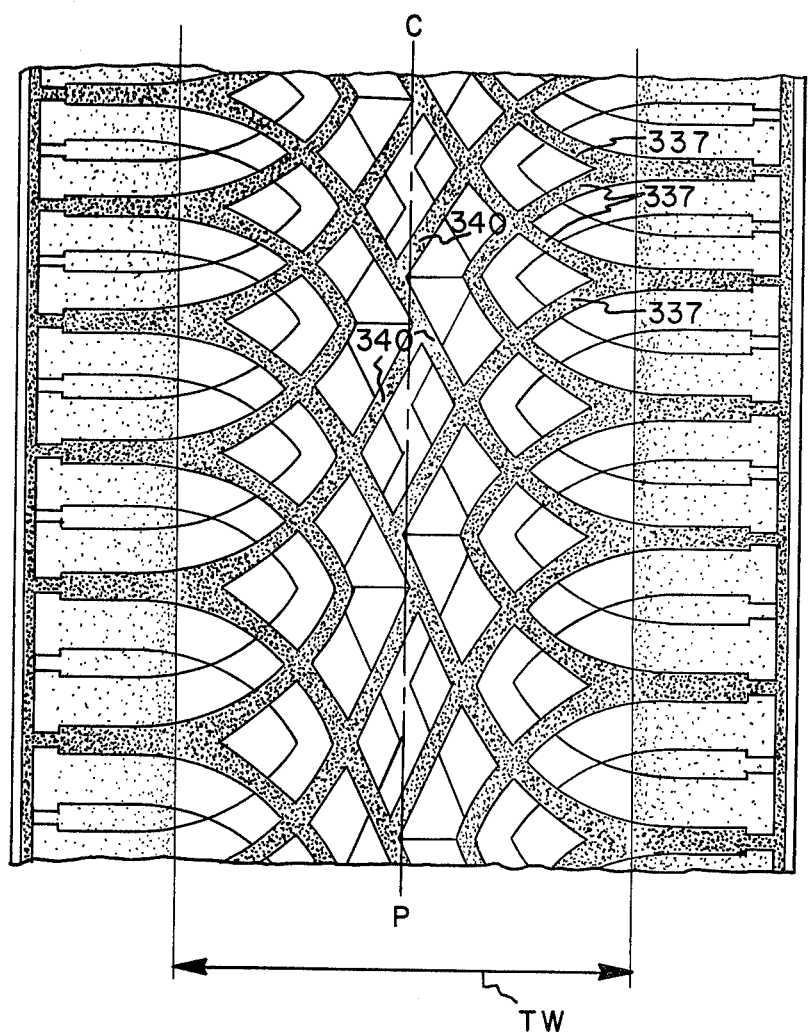

Referring to FIG. 7, there is illustrated yet another modified form of the present invention wherein some of the elliptically shaped grooves 337 which extend from one tread edge interconnect with elliptically shaped grooves starting from the opposed tread edge and are connected by a network of grooves 340 which form an angle no greater than approximately 60° with respect to the mid-circumferential centerplane, preferably each groove 340 is substantially straight.

While certain representative embodiments and details have been shown for the purposes of illustrating the invention, it will be apparent to those skilled in the art that various changes and modifications can be made without departing from the spirit or scope of the present invention. For example, the repeating design cycle of the tread of a tire made in accordance with the present invention may be varied about the tire (also known in the tire industry as pitching of the tread design). Additionally, if desired, various blades or sipes may be placed in the tread pattern as illustrated in FIG. 7 or circumferentially extending grooves such as illustrated in FIG. 6 may be added.

I claim:

1. A tire comprising a ground-engaging tread portion having a pair of axially opposed tread edges characterized by said ground-engaging tread portion having a set of circumferentially adjacent grooves extending from each of said respective tread edges across the axial width of said tread a distance of at least twenty-five percent (25%) of the tread width, each of said grooves having a pair of ends at said tread edge and a pair of circumferentially spaced branches, said branches extending from each of said ends, respectively, meeting at a common point, each of said grooves generally following an elliptical path having one axis which is generally perpendicular to the mid-circumferential centerplane of the tire and a second axis which is substantially parallel to said mid-circumferential centerplane of said tire, said second axis being spaced from the tread edge from which said grooves start a distance not greater than one-eighth (⅛) of the width of said tread portion, said circumferentially adjacent grooves are disposed about said tire so that the center line of each branch is substantially tangent to the center line of the branch of the next circumferentially adjacent groove in the area of said tread portion closely adjacent said tread edge.

2. A tire according to claim 1 further characterized by said tread portion having a second set of circumferentially adjacent grooves extending from at least one of said tread edges across the axial width of said tread a distance of at least twenty-five percent (25%) of the tread width, each of said grooves having a pair of ends at said tread edge and a pair of circumferentially spaced branches, said branches extending from each of said ends, respectively, meeting at a common point said grooves generally following an elliptical path having one axis generally perpendicular to the mid-circumferential centerplane of the tire and a second axis being substantially parallel to said mid-circumferential centerplane of said tire, said second axis is spaced from the tread edge from which said grooves start a distance not greater than one-eighth (⅛) of the width of said tread portion, said circumferentially adjacent grooves are disposed about said tire so that the center line of each of the branches of said grooves is substantially tangent to the center line of the branch of the next circumferentially adjacent groove in the area of said tread portion closely adjacent said tread edge.

3. A tire according to claim 1 further characterized by each of said grooves of said first set of circumferentially adjacent grooves having a substantially identical configuration.

4. A tire comprising a ground-engaging tread portion having a pair of axially opposed tread edges characterized by said ground-engaging tread having a set of circumferentially adjacent grooves extending from each of said respective tread edges across the axial width of said tread a distance of at least thirty percent (30% of the tread width, each of said grooves having a pair of ends at said tread edge and a pair of circumferentially spaced branches, said branches extending from each of said ends to a termination point, said branches of said grooves generally following an elliptical path having one axis generally perpendicular to the mid-circumferential centerplane of the tire and a second axis being substantially parallel to the mid-circumferential centerplane of the tire, said second axis of each said groove being spaced from the tread edge from which the grooves start a distance not greater than one-eighth (⅛) of the width of said tread portion, said termination point of each of said branches is spaced from the point at which the path of said ellipse is spaced furthest from said tread edge from which said grooves start an axial distance no greater than about one-eighth (⅛) of the tread width, said grooves are disposed about said tire such that each branch of said grooves is substantially tangent to the branch of the next circumferentially adjacent groove in the area of the tread portion closely adjacent the tread edge.

5. A tire according to claim 4 further characterized by said tread portion having a second set of circumferentially adjacent grooves extending from at least one of said tread edges across the axial width of said tread a distance of at least thirty percent (30%) of the tread width, each of said grooves having a pair of ends at said tread edge and a pair of circumferentially spaced branches, each branch extending from one of said ends to a termination point, said branches of said grooves generally following an elliptical path having one axis generally perpendicular to the mid-circumferential centerplane of the tire and a second axis being substantially parallel to the mid-circumferential centerplane of the tire, said second axis of each being spaced from the tread edge from which the grooves start a distance not greater than one-eighth (⅛) of the width of said tread portion, said termination point of each of said branches is spaced from the point at which the elliptical path is spaced furthest from said tread edge from which said grooves start an axial distance no greater than about one-eighth (⅛) of the tread width, said grooves are disposed about said tire such that each branch of said grooves is substantially tangent to the branch of the next circumferentially adjacent groove in the area of the tread portion closely adjacent the tread edge.

6. A tire according to claims 1 or 4 further characterized by said tread portion having a net to gross of at least fifty percent (50%).

7. A tire according to claims 1 or 4 further characterized by said grooves of said first set of circumferentially adjacent grooves following alternately two different sized elliptical paths.

8. A tire according to claims 1 or 4 further characterized by said axis parallel to the mid-circumferential centerplane of said tire having a length which ranges from approximately fifty percent (50%) to one hundred sixty percent (160%) of the width of said tread portion.

9. A tire according to claims 1 or 4 further characterized in that a circumferentially extending continuous rib is formed between said first set of grooves extending from each tread edge.

* * * * *